March 3, 1970  D. J. ST. JEAN ET AL  3,498,119
APPARATUS FOR CIRCUMFERENTIALLY STRESSING TUBING
Filed April 24, 1968
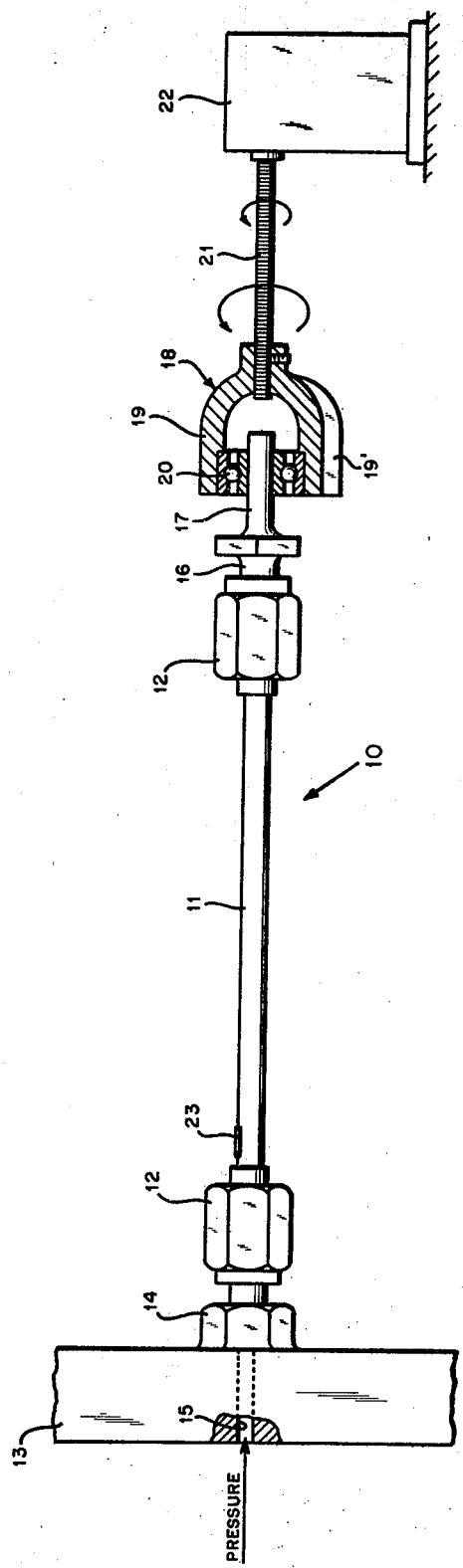
INVENTORS
DAVID J. St JEAN
FRANCIS P. DONAGHY, SR.
LOUIS P. CAVALIERE
BY
ATTORNEY

United States Patent Office 3,498,119
Patented Mar. 3, 1970

3,498,119
APPARATUS FOR CIRCUMFERENTIALLY
STRESSING TUBING
David J. St. Jean, Westfield, Mass., Francis P. Donaghy, Sr., Gloucester, N.J., and Louis P. Cavaliere, Upper Darby, Pa., assignors to the United States of America as represented by the Secretary of the Navy
Filed Apr. 24, 1968, Ser. No. 723,707
Int. Cl. G01n 3/32
U.S. Cl. 73—100         3 Claims

ABSTRACT OF THE DISCLOSURE

The subject invention concerns a method and apparatus for applying and measuring the effects of circumferential loads on a substantially rigid, cylindrical pressure vessel or the like. An eccentric mass is rotated by means of a flexible coupling on a bearing surface mounted adjacent one end of a vessel which is fixed at its other end so that the vessel is deflected equally in all directions to produce a circumferential stress thereon.

---

The invention described herein may be manufactured and used by or for the Government of the United States of America for governmental purposes without the payment of any royalties thereon or therefor.

The present invention relates particularly to a flexure qualification test for metallic tubing subject to internal fluid pressure where the tubing is uniformly stressed at all points along its circumference during the taking of stress measurements.

Due to the increasing complexity of modern machinery and structural elements and the necessity for increased reliability and safety therein, it is necessary to test each of the separate components which combine to make a system or to sample a substantial proportion of mass produced parts prior to their being combined. This qualification testing is an important step in the production process which insures that the elements and hence the system function adequately and will not fail due to inherent defects in the design and material used.

As certain components become standardized and come into general use throughout particular industries, certain standards and specifications are set up, for example, by the Society of Automotive Engineers, by which these particular parts or components must be tested and comply with before they may be used. In particular, if a part is to be manufactured for the military, it must meet certain strict requirements which are established by military specifications which are written for that particular part or parts.

At present, a military specification is in existence which establishes the requirements and testing procedures which must be passed for tubing, tube connection fittings, nuts and sleeves to be used in aeronautical fluid systems or the like. One performance test to be administered to the tubing assembly is a flexural strength test using a cantilever beam method. The tubing assembly is placed on a fixture which maintains the assembly rigidly fixed at one end and pivotally attached at its other end. The tubing is pressurized according to its working pressure and the fixture is vibrated at the pivoted end on a vibrating table which causes the tubing assembly to deflect at its pivoted end in a vertical plane at a natural frequency. Measurement of the stress on the tubing is obtained by placing two strain gauges 180 degrees apart on the periphery of the tube in the plane of maximum stress, that is, the top center and bottom center of the tubing. This current method accurately measures the required stress level for the tubing assembly, but only along one plane of the circumference. Only those imperfections or defects which would be located in this single plane are subjected to a stress load. Any imperfections which are positioned other than at the top center or bottom center of the tubing would go undetected. The problem is aggravated when the tube connection fittings are brazed or soldered to the tubing. Such connections are usually much weaker than the materials being connected. Also, the vibration equipment necessary for the present method is very large, delicate and too expensive to use for prolonged operation or life testing.

It is therefore an object of the present invention to provide a novel and improved method and apparatus for uniformly circumferentially stressing tubular materials or components using a cantilever beam construction.

It is another object of the present invention to provide a novel and improved method whereby defects in fluid system connecters which are not otherwise recognizable can be accurately detected, regardless of location.

It is a further object of the present invention to provide a novel and improved method and apparatus for equally and simultaneously circumferentially stressing tubing which is relatively simple in construction and yet highly accurate and reliable in use.

Other objects and many of the attendant advantages of this invention will be readily appreciated as the same becomes better understood by reference to the following detailed description when considered in connection with the accompanying drawing, wherein the single figure is a front elevational view, with a portion shown in section, of a preferred embodiment of the apparatus of the invention.

Referring now to the details of the single figure of the drawing, the fluid assembly 10 to be tested comprises the tubing 11 and its related connection fittings 12. The tubing 11 and connection fittings 12 to be tested may be fabricated from steel or aluminum alloy, for example. The assembly 10 is rigidly affixed at one end to a portion of the stationary vertical frame 13 of a test fixture by means of a supporting bolt adapter 14. An air channel 15 is provided in the frame 13 which allows the assembly 10 to be pressurized with its necessary working pressure during the testing procedure. The other end of the assembly 10 is sealed by a plug 16 which preserves the working pressure in the assembly during testing. A shaft 17 is welded to the outer portion of the plug 16, or the shaft 17 and the plug 16 may be machined from one continuous length of material. The shaft 17 forms the inner stationary race for the bearing assembly 18, or a sleeve may be fitted around the circumference of the shaft 17, in any well known manner, whose operation will become more apparent hereinafter.

A housing 19, which may be machined from aluminum alloy, for example, is designed to house a single row of rolling elements 20 and also forms the movable outer race therefor. The housing 19 is designed so that it will have an unequal mass 19' on either side of its rotational axis, that is, so that it is eccentric and thereby unbalanced when it is being rotated, for a purpose which will be set forth later. As an alternative to providing an initially unbalanced housing 19, a mass may be affixed to the outer periphery of the housing at a known radius to provide eccentricity thereto. It is to be noted that the rolling elements 20 are shown as ball bearings, although obviously roller or needle bearings can be used. The shaft 17, rolling elements 20 and housing 19 combine to form the bearing assembly 18 which preferably has low friction and is capable of high rotational speeds. The bearing assembly 18 is rotated by a flexible drive shaft 21 connected between the housing 19 and a variable speed motor 22. The drive shaft 21 is securely clamped to the rear of the housing 19 in any common or preferred manner.

In operation, the variable speed motor 22 begins to rotate the housing 19 through the flexible drive shaft 21. Because the housing 19 is unbalanced, a gradual increase in rotational speed will impart a corresponding increase in centrifugal force to the unbalanced mass, causing the bearing assembly 18 and the flexible shaft 21 to swing off the longitudinal rotational axis and to rotate on a uniform circular path or orbit around the longitudinal axis, thereby deflecting the end of the fluid assembly 10 adjacent the bearing assembly 18 in this circular path to produce an equal circumferential stress at all points on the fluid assembly. An appropriate strain gage 23, which has been cemented to the tubing 11 and suitably oriented, is employed to relay signals to recording instruments to measure and monitor the strains now present in the assembly 10. These strains are then translated to the appropriate stress measurements and compared to the specification standards. By changing the weight or the unbalance of the eccentric mass 19, the speed of the motor 22 or the length of the tubing 11, the radius of the circular rotational path may be changed, thereby satisfying the various stress loading requirements of the particular assembly 10 under test.

Obviously many modifications and variations of the present invention are possible in the light of the above teachings. It is therefore to be understood that, within the scope of the appended claims, the invention may be practiced otherwise than as specifically described.

What is claimed is:
1. Apparatus for circumferentially stressing a substantially rigid tubing or the like, comprising:
    (a) a stationary vertical frame member having one end of the tubing rigidly affixed thereto;
    (b) plug means inserted into the other end of the tubing having a shaft extending from its opposite side along the longitudinal axis of said tubing;
    (c) an unbalanced bearing assembly rotatably mounted on the shaft extending from the plug means;
    (d) a variable speed motor;
    (e) and a flexible drive shaft connecting the motor with the bearing assembly so that when the bearing assembly is rotated the tubing will be deflected in a uniform circular path around its longitudinal axis thereby producing an equal circumferential stress at all points on said tubing.

2. Apparatus substantially as described in claim 1, wherein the bearing assembly comprises an eccentric housing fixture and a single row of ball bearings housed therein to rotate on the shaft extending from the plug means.

3. Apparatus substantially as described in claim 1, wherein the stationary frame includes an air channel therein adjacent the fixed end of the tubing to allow the tubing to be pressurized during the stressing thereof.

References Cited
UNITED STATES PATENTS

| | | | |
|---|---|---|---|
| 2,657,573 | 11/1953 | Castricum | 73—100 |
| 2,761,310 | 9/1956 | Siegel | 73—100 X |
| 3,180,137 | 4/1965 | Tannenberg | 73—100 |
| 3,376,921 | 4/1968 | Manry et al. | 73—88.5 X |

JERRY W. MYRACLE, Primary Examiner

U.S. Cl. X.R.

73—49.5